(12) United States Patent
Thurlkill et al.

(10) Patent No.: US 11,326,802 B2
(45) Date of Patent: May 10, 2022

(54) SYSTEMS AND METHODS FOR INTELLIGENTLY CONTROLLING A HYBRID CASCADE BOILER SYSTEM

(71) Applicant: Rheem Manufacturing Company, Atlanta, GA (US)

(72) Inventors: Stephen Thurlkill, Oxnard, CA (US); Jorge Miguel Gamboa Revilla, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/002,020

(22) Filed: Aug. 25, 2020

(65) Prior Publication Data

US 2022/0065486 A1    Mar. 3, 2022

(51) Int. Cl.
| | |
|---|---|
| *F24F 11/65* | (2018.01) |
| *F24F 11/64* | (2018.01) |
| *G05D 23/19* | (2006.01) |
| *G05B 19/042* | (2006.01) |
| *F24H 8/00* | (2022.01) |
| *F24H 1/22* | (2022.01) |

(52) U.S. Cl.
CPC .............. *F24F 11/65* (2018.01); *F24F 11/64* (2018.01); *G05B 19/042* (2013.01); *G05D 23/1917* (2013.01); *F24H 1/22* (2013.01); *F24H 8/00* (2013.01); *G05B 2219/2614* (2013.01)

(58) Field of Classification Search
CPC ......... F24F 11/65; F24F 11/64; G05B 19/042; G05B 2219/2614; G05D 23/1917; F24H 8/00; F24H 1/22

USPC ......................................................... 700/276
See application file for complete search history.

(56) References Cited

U.S. PATENT DOCUMENTS

| | | |
|---|---|---|
| 8,479,689 B2 | 7/2013 | Pitonyak et al. |
| 9,863,646 B2 | 1/2018 | Johnson, Jr. et al. |
| 10,288,300 B2 | 5/2019 | Kovalcik et al. |

(Continued)

FOREIGN PATENT DOCUMENTS

| | | |
|---|---|---|
| EP | 3006858 A1 | 4/2016 |
| RU | 2090805 C1 | 9/1997 |
| RU | 50291 U1 | 12/2005 |

OTHER PUBLICATIONS

International Search Report and Written Opinion for PCT Application No. PCT/US2021/046440 dated Nov. 3, 2021.

*Primary Examiner* — Michael W Choi
(74) *Attorney, Agent, or Firm* — Troutman Pepper Hamilton Sanders; James E. Schutz; Micah B. Hensley (57) ABSTRACT

The disclosed technology includes a controller for a cascade boiler system having both condensing and non-condensing boilers. The controller can receive supply water temperature data and return water temperature data to determine a current temperature differential in the system. The controller can determine a current load demand value using the current temperature differential and a set point temperature. If the current load demand value is less than or equal to a first load demand threshold, the controller can output a control signal for a condensing boiler to transition to a heating mode. If the current load demand value is greater than a second load demand threshold, the controller can output a control signal for a non-condensing boiler to transition to a heating mode.

19 Claims, 6 Drawing Sheets

(56) References Cited

U.S. PATENT DOCUMENTS

| | | | |
|---|---|---|---|
| 2008/0021749 A1* | 1/2008 | Hope | G06Q 10/06314 705/7.24 |
| 2010/0006042 A1* | 1/2010 | Pitonyak | F22B 33/00 122/448.3 |
| 2013/0048745 A1* | 2/2013 | Johnson, Jr | F01K 17/02 237/8 A |
| 2016/0299516 A1* | 10/2016 | Holub | G05B 15/02 |

* cited by examiner

SYSTEMS AND METHODS FOR INTELLIGENTLY CONTROLLING A HYBRID CASCADE BOILER SYSTEM

FIELD OF TECHNOLOGY

The present disclosure relates generally to systems and methods for controlling a boiler system, and, more particularly, to systems and methods for controlling a hybrid boiler system having both condensing and non-condensing boilers.

BACKGROUND

Boiler systems are commonly used in commercial and residential applications to heat air and water used in a building. Boiler systems today can utilize many types of boilers, including non-condensing and condensing boilers. Both non-condensing and condensing boilers are designed to consume fuel in a burner and pass the resultant combustion gases through a heat exchanger to heat water, for example.

Non-condensing boilers, commonly referred to as traditional boilers, are designed to vent combustion gases to the atmosphere above condensation temperature. In this way, non-condensing boilers operate with combustion gas temperatures that are high enough to ensure moisture in the flue gas does not condense. Condensing boilers, on the other hand, are designed to extract more latent heat out of the combustion gases to the point where moisture in the flue gas will begin to condense and can accumulate in the exhaust. Because more heat is extracted from the flue gas, condensing boilers tend to be more efficient than non-condensing boilers, especially at lower loads or cooler operating temperatures.

Some boiler systems integrate multiple boilers in a cascading arrangement to more efficiently meet the varying load in the system. These cascade boiler systems are able to increase the overall system efficiency because they can increase the system's turndown ratio by operating effectively at lower loads while continuing to be operable at the system's highest demand level. In an attempt to further increase the efficiency of a cascade boiler system, some cascade boiler systems utilize a combination of condensing and non-condensing boilers. Many of these hybrid boiler systems, however, are limited in their effectiveness because the control system for the boilers is unable to determine when to operate a given type of boiler (e.g., a condensing boiler, a non-condensing boiler) based on current system conditions. This shortcoming can be due, in part, to the fact that many cascade boiler systems are controlled based on data relating solely or primarily to the ambient temperature and the temperature of the supply water. These data points are then used to determine how much heat is required to heat the water based on an assumed temperature differential across the building. This static, predetermined temperature differential is typically calculated for a given building and programmed into a controller of a cascade boiler system. Using a static, predetermined temperature differential can result in inefficient use of the available boilers as well as excessive cycling of the boilers because the control system is unable to effectively respond to changes in load demand.

To further complicate matters, some cascade boiler systems include condensing and non-condensing boilers having varying capacities (e.g., 50K BTUH, 200K BTUH, 500K BTUH, 1M BTUH, 2M BTUH, etc.). Current cascade boiler control systems, however, are unable to consider the various available boiler capacities to effectively operate the boiler system based on the present load demand. This can also cause inefficiencies when operating the cascade boiler system.

What is needed, therefore, is a cascade boiler control system that can determine the most efficient boiler to operate for a given load demand by considering the type and capacity of boilers available as well as the current temperature differential. This and other problems are addressed by the technology disclosed herein.

SUMMARY

The disclosed technology relates generally to systems and methods for intelligently controlling hybrid boiler systems that have both condensing and non-condensing boilers. The disclosed technology can include a non-transitory, computer-readable medium storing instructions that, when executed by one or more processors, cause a boiler system controller to receive supply water temperature data from a supply water temperature sensor. The supply water temperature data can be indicative of a temperature of water supplied from a boiler system associated with the boiler system controller. The instructions can further cause the controller to receive, from a return water temperature sensor, return water temperature data indicative of a temperature of water returning to the boiler system. The instructions can also cause the controller to determine a current temperature differential value based at least in part on the supply water temperature data and the return water temperature data as well as determine a current load demand value based at least in part on the current temperature differential value and a set point temperature. A user can define the set point temperature. The instructions can further cause the controller to instruct one or more boilers from among a plurality of boilers to transition to a heating mode for heating water in the boiler system. The plurality of boilers can include a condensing boiler and a non-condensing boiler.

Instructing the one or more boilers from among the plurality of boilers to transition to a heating mode for heating water in the boiler system can include: in response to the current load demand value being less than or equal to a first load demand threshold, outputting a control signal for the condensing boiler to transition to the heating mode for heating water in the boiler system; and in response to the current load demand value being greater than a second load demand threshold, outputting a control signal for the non-condensing boiler to transition to the heating mode for heating water in the boiler system.

The disclosed technology can also include the second load demand threshold being greater than the first load demand threshold. If the second load demand threshold is greater than the first load demand threshold, instructing the one or more boilers from among the plurality of boilers to transition to the heating mode for heating water in the boiler system can include, in response to the current load demand value being greater than the first load demand threshold and less than or equal to the second load demand threshold, outputting a control signal for the condensing boiler and the non-condensing boiler to transition to the heating mode for heating water in the boiler system.

The instructions, when executed by the one or more processors, can further cause the boiler system controller to retrieve boiler data indicative of a type and a capacity of boiler available for heating. The controller can further determine, based on the current load demand value, a required boiler capacity necessary to satisfy the current load demand value. Instructing the one or more boilers from among the plurality of boilers to transition to the heating mode for heating water in the boiler system can further include, in response to the current load demand value being less than or equal to the first load demand threshold, selecting a size-appropriate condensing boiler and outputting a control signal to the size-appropriate condensing boiler to transition to the heating mode for heating water in the boiler system. The size-appropriate condensing boiler can have a capacity corresponding to the required boiler capacity.

Instructing the one or more boilers from among the plurality of boilers to transition to the heating mode for heating water in the boiler system can further include, in response to the current load demand value being greater than the second load demand threshold, selecting a size-appropriate non-condensing boiler and outputting a control signal to the size-appropriate non-condensing boiler to transition to the heating mode for heating water in the boiler system. The size-appropriate non-condensing boiler can have a capacity corresponding to the required boiler capacity.

The instructions, when executed by the one or more processors, can further cause the boiler system controller to receive, from a flow sensor, flow data indicative of a flow of water in the boiler system. Furthermore, determining the current load demand value can further include determining the current load demand value based at least in part on the current temperature differential value, the set point temperature, and the flow data.

In response to the current load demand value being greater than the first load demand threshold and less than or equal to a second load demand threshold, the instructions can further cause the boiler system controller to output a control signal for a condensing and a non-condensing boiler to transition to a heating mode for heating water in the boiler system. The second load demand threshold can be greater than the first load demand threshold.

The instructions can further cause the boiler system controller to receive, from an ambient air temperature sensor, ambient air temperature data indicative of a temperature of ambient air and determine the current load demand value based at least in part on the current temperature differential value, the set point temperature, and the ambient air temperature data.

In response to the current load demand value being greater than the first load demand threshold and less than or equal to a second load demand threshold, the instructions can further cause the boiler system controller to output a control signal for a condensing and a non-condensing boiler to transition to a heating mode for heating water in the boiler system. The second load demand threshold can be greater than the first load demand threshold.

The instructions can further cause the boiler system controller to retrieve, from a memory associated with the boiler system controller, a predetermined parallel control setting configured to cause the controller to operate the plurality of boilers in a parallel control mode. In response to the current load demand value being less than or equal to a first load demand threshold and based on the predetermined parallel control setting, the instructions can cause the controller to output a control signal for a plurality of condensing boilers from among the plurality of boilers to transition to a heating mode for heating water in the boiler system in the parallel control mode. Furthermore, in response to the current load demand value being greater than a second load demand threshold and based on the predetermined parallel control setting, the instructions can cause the controller to output a control signal for a plurality of non-condensing boilers from among the plurality of boilers to transition to the heating mode for heating water in the boiler system in the parallel control mode. A user can define the predetermined parallel control setting.

The instructions can further cause the boiler system controller to retrieve, from a memory associated with the controller, a predetermined sequential control setting configured to cause the controller to operate the plurality of boilers in a sequential control mode. In response to the current load demand value being less than or equal to a first load demand threshold and based on the predetermined sequential control setting, the instructions can cause the controller to output a control signal for a plurality of condensing boilers from among the plurality of boilers to transition to a heating mode for heating water in the boiler system in the sequential control mode. Furthermore, in response to the current load demand value being greater than a second load demand threshold and based on the predetermined sequential control setting, the instructions can cause the controller to output a control signal for a plurality of non-condensing boilers from among the plurality of boilers to transition to the heating mode for heating water in the boiler system in the sequential control mode. A user can define the predetermined sequential control setting.

The instructions can further cause the boiler system controller to retrieve, from a memory associated with the controller, a boiler operation schedule corresponding to operation of the plurality of boilers. In response to the current load demand value being less than or equal to a first load demand threshold, the instructions can cause the controller to select a scheduled condensing boiler from among the plurality of boilers based on the boiler operation schedule and output a control signal for the scheduled condensing boiler to transition to the heating mode for heating water in the boiler system. In response to the current load demand value being greater than a second load demand threshold, the instructions can cause the controller to select a scheduled non-condensing boiler from among the plurality of boilers based on the boiler operation schedule and output a control signal for the scheduled non-condensing boiler to transition to the heating mode for heating water in the boiler system. A user can input the boiler operation schedule.

The instructions can further cause the boiler system controller to retrieve, from a memory associated with the boiler system controller, a time delay setting configured to cause the controller to delay output of one or more control signals for delay duration to prevent excessive cycling of one or more boilers of the plurality of boilers. In response to the current load demand value remaining less than or equal to the first load demand threshold and subsequent to expiration of the delay duration, the instructions can cause the controller to output the control signal for the condensing boiler to transition to the heating mode for heating water in the boiler system. In response to the current load demand value being greater than the second load demand threshold and subsequent to expiration of the delay duration, the instructions can cause the controller to output the control signal for the non-condensing boiler to transition to the heating mode for heating water in the boiler system. A user can input the time delay setting.

The disclosed technology can include a cascade boiler system having a plurality of boilers. The plurality of boilers can include a condensing boiler and a non-condensing boiler. The cascade boiler system can further include a supply water temperature sensor configured to detect a temperature of water supplied from the cascade boiler system and a return water temperature sensor configured to detect a temperature of water returned to the cascade boiler system. The cascade boiler system can also include one or more processors and a memory in communication with the one or more processors and storing instructions that, when executed by the one or more processors, can cause the one or more processors to receive, from the supply water temperature sensor, supply water temperature data and receive, from the return water temperature sensor, return water temperature data. The instructions can further cause the one or more processors to determine a current temperature differential value based at least in part on the supply water temperature data and the return water temperature data. The instructions can also cause the one or more processors to determine a current load demand value based at least in part on the current temperature differential value and a set point temperature and instruct one or more boilers from among a plurality of boilers to transition to a heating mode for heating water in the cascade boiler system.

In response to the current load demand value being less than or equal to a first load demand threshold, the instructions can cause the one or more processors to output a control signal for a condensing boiler to transition to a heating mode for heating water in the boiler system. Furthermore, in response to the current load demand value being greater than a second load demand threshold, the instructions can cause the one or more processors to output a control signal for a non-condensing boiler to transition to the heating mode for heating water in the boiler system.

The second load demand threshold can be greater than the first load demand threshold. In response to the current load demand value being greater than the first load demand threshold and less than or equal to the second load demand threshold, the instructions can cause the one or more processors to output a control signal for a condensing boiler and a non-condensing boiler to transition to the heating mode for heating water in the boiler system.

The instructions, when executed by the one or more processors, can further cause the one or more processors to receive, from a flow sensor associated with the cascade boiler system, flow data indicative of a flow of water in the boiler system. Furthermore, the instructions can cause the one or more processors to determine the current load demand value based at least in part on the current temperature differential value, the set point temperature, and the flow data.

The instructions, when executed by the one or more processors, can further cause the one or more processors to receive, from an ambient air temperature sensor associated with the cascade boiler system, ambient air temperature data indicative of a temperature of ambient air. Furthermore, the instructions can cause the one or more processors to determine the current load demand value based at least in part on the current temperature differential value, the set point temperature, and the ambient air temperature data.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

The disclosed technology relates generally to systems and methods for intelligently controlling boiler systems, such as hybrid boiler systems that have both condensing and non-condensing boilers. The disclosed technology can include a boiler system having multiple boilers arranged in a cascading configuration and a controller configured to determine when and which boilers should be operated and to what output a given boiler should be operated (e.g., determine the most efficient boiler to operate given the current system conditions). The boiler system can include both condensing and non-condensing boilers. Some or all of the boilers can have a different capacity (e.g., 50K BTUH, 200K BTUH, 500K BTUH, 1M BTUH, 2M BTUH, etc.). The controller can receive information from each available boiler to determine the type and capacity of each boiler currently available, as well as information from one or more sensors. That is, the controller can receive real-time data input from the connected boilers to determine which boiler(s) would most efficiently meet the current load demand based on various inputs such as temperature data, flow data, and set point data. Additionally, the controller can be configured to modify the control of certain boiler(s) based on predetermined settings and/or certain circumstances. These settings can include a lag time between boiler startups to help prevent excessive cycling, a heavy load response to ensure the boilers are able to quickly meet the current demand even if a fast response is not the most efficient response, a scheduled rotation of the operation of selected boilers, a predetermined group of boilers to use as backup boilers to meet current load demand, as well as other predetermined settings. As will be made apparent throughout this disclosure, the disclosed technology can include systems and methods to operate a cascade boiler system having both condensing and non-condensing boilers of various capacities in a more efficient manner than existing designs.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of systems and methods for intelligently controlling hybrid boiler systems that have both condensing and non-condensing boilers of various capacities. The present disclosure, however, is not so limited, and can be applicable in other contexts where intelligent control of a hybrid boiler system having boilers of various capacities is desirable. The present disclosure, for example and not limitation, can include boiler systems having only non-condensing boilers or only condensing boilers. Furthermore, although described in the context of a boiler system used to provide heat to a building, the disclosed technology can include boiler systems designed for other purposes such as water heating, pool heating, ice melting, and other process heating applications in the manufacturing, food, pharmaceutical, fire, research, or other industries. Such implementations and applications are contemplated within the scope of the present disclosure. Accordingly, when the present disclosure is described in the context of being a control system for a cascade boiler system, it will be understood that other implementations can take the place of those referred to. Additionally, the boilers described in this disclosure are not limited by type of fuel source. For example, the boilers described in this disclosure can include boilers designed to operate using fossil fuels, biomass, renewable energy sources, or any other type of fuel that can be used to operate condensing and non-condensing boilers.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

As used herein, the terms and/or phrases "real-time," "substantially real-time," "instantaneously," and "substantially instantaneously" can each refer to processing and/or displaying data without intentional delay, given the processing limitations of the system (e.g., the limitations of one or more processors and/or memory of the system) and the time required to accurately detect, measure, calculate, analyze, and/or display the data.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described.

Figure 1:
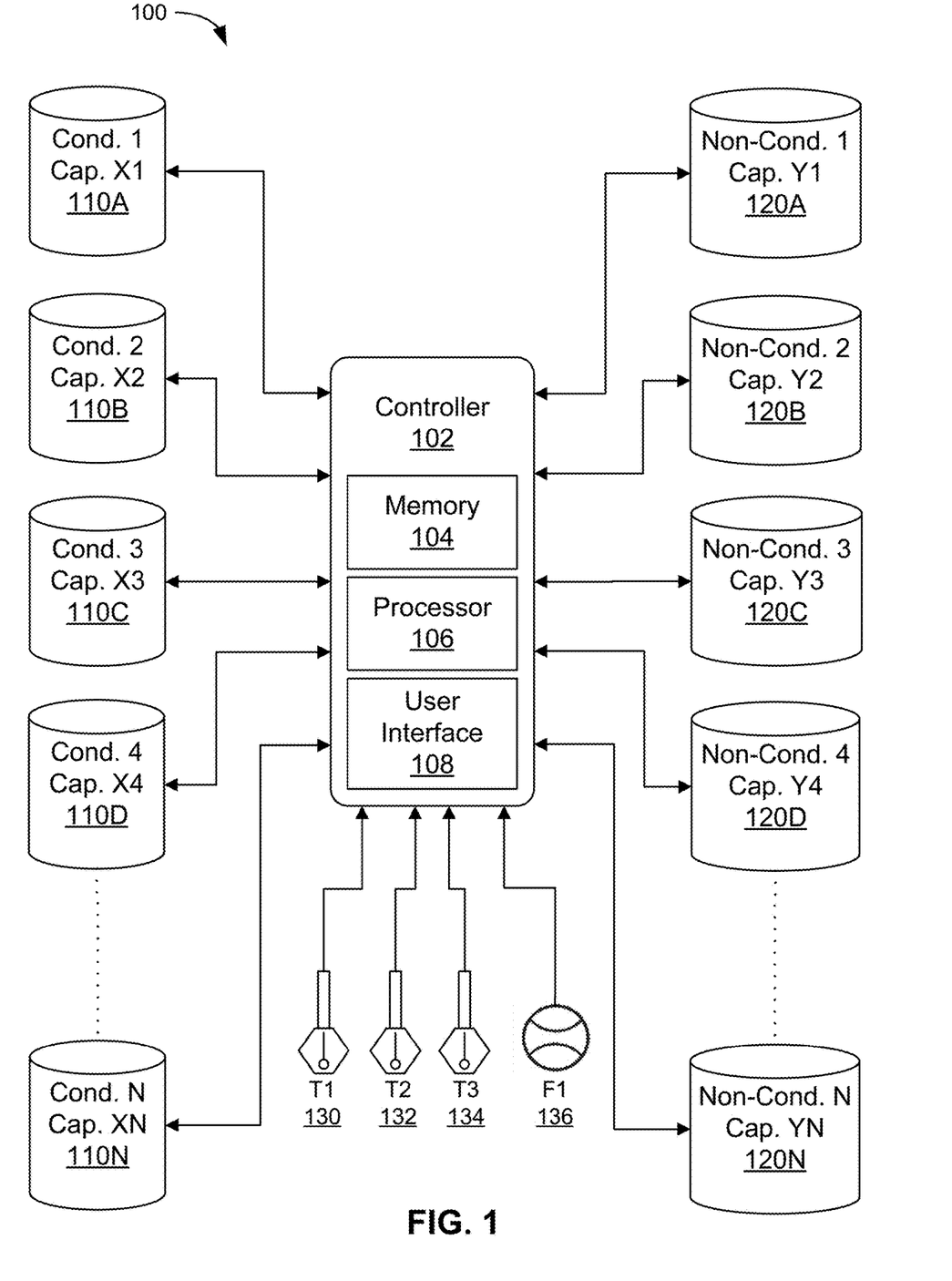
FIG. 1 illustrates an example system for intelligently controlling a hybrid cascade boiler system, in accordance with the disclosed technology.

As depicted in FIG. 1, the cascade boiler control system 100 can include a controller 102 having a memory 104, a processor 106, and a user interface 108. The controller 102 can be in communication with one or more Condensing Boilers 110A-110N and one or more non-condensing boilers 120A-120N. As will be appreciated, the controller 102 can be configured to communicate with any number of boilers (e.g., as many boilers are as installed in a given boiler system). Therefore, this disclosure should not be construed as limited to the number of boilers depicted in FIG. 1 or expressly described herein. Additionally, the controller 102 can be configured to receive data from one or more sensors, including, but not limited to a supply water temperature sensor 130, a return water temperature sensor 132, an ambient air temperature sensor 134, and/or a flow sensor 136.

As will be discussed in greater detail herein, the controller 102 can be configured to receive data from the condensing boilers 110A-110N, the non-condensing boilers 120A-120N, and the various sensors (e.g., the supply water temperature sensor 130, the return water temperature sensor 132, the ambient air temperature sensor 134, and the flow sensor 136) and, based on the received data, determine which boiler(s) would be most efficient to operate to meet the current load demand and/or to what extent the selected boiler(s) should be operated (i.e., the output of the selected boiler(s) needed to meet the current load demand).

The controller 102 can have a memory 104 and a processor 106. The controller 102 can be or include a computing device configured to receive data, determine actions based on the received data, and output a control signal instructing one or more components of the system 100 to perform one or more actions. One of skill in the art will understand that the controller 102 can be installed in any location, provided the controller 102 is in communication with at least some of the components of the system 100. For example, the controller 102 can be installed locally with the cascade boiler system 100 (e.g., a part or portion of the cascade boiler system 100 such as an integrated controller of a boiler of the cascade boiler system). As another example, the controller 102 can be installed at a location remote from the cascade boiler system 100 (e.g., at a remote server). Furthermore, the controller 102 can be configured to send and receive wireless or wired signals, and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 102 can have a hard-wired 24 VDC connection to the various components. Alternatively, the components can be powered directly from a power source and receive control instructions from the controller 102 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 102 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 102 can include a memory 104 that can store a program and/or instructions associated with the functions and methods described herein and can include one or more processors 106 configured to execute the program and/or instructions. The memory 104 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory.

The controller 102 can be configured to communicate with a user interface 108. The user interface 108 can be configured to display system information, instructions, and the like to a user or technician. The controller 102 can incorporate the user interface 108 as part of the controller 102 itself or the user interface 108 can be separate from the controller 102 and be integrated into a housing with the controller 102, installed remotely from the controller 102 and in wired or wireless communication with the controller 102, or the user interface 108 can be a remote device (e.g., a user's mobile device or other hand held device) that is in communication with the controller 102 (e.g., directly, via one or more networks). The controller 102 can be configured to receive inputs from a user via the user interface 108. The controller 102 can operate based on the user input or be configured to override the user's input based on various system conditions depending on the application.

Information provided by the user interface 108 can include information about current system 100 data, which can include information detailing which boiler(s) is/are operating, at what capacity the boiler(s) is/are currently operating, one or more system temperatures, one or more flow rates, one or more pressures, historical use data, one or more maintenance schedules, which loads within the building are currently using the most heat, and/or, as will be discussed in greater detail herein, the current settings of the cascade boiler system 100. The user interface 108 can also be configured to receive inputs from a user such that the user can configure the cascade boiler control system 100 to operate and respond to load demands as desired. As an example, this can enable a user to change settings on the controller 102 to respond to load demands quickly or to respond to load demands in a more cost-efficient manner. The condensing boilers 110A-110N can be or include any type of condensing boiler and any capacity of condensing boiler as would be suitable for the particular application. Similarly, the non-condensing boilers 120A-120N can be or include any type of non-condensing boiler as would be suitable for the particular application. As shown in FIG. 1, each condensing boiler 110A-110N can have a corresponding capacity X1-XN and each non-condensing boiler 120A-120N can have a corresponding capacity Y1-YN. For example, the condensing boilers 110A-110N and non-condensing boilers 120A-120N can have capacities ranging from less than 10K BTUH to capacities of greater than 2M BTUH. As will be appreciated, the controller 102 can be configured to control boilers of any capacity. Furthermore, the condensing boilers 110A-110N need not be of the same capacity but can be of varying capacities. Similarly, the non-condensing boilers 120A-120N need not be of the same capacity but can be of varying capacities. Having boilers of varying capacities can help ensure the system 100 is able to meet varying load demands in the most efficient way possible.

The condensing boilers 110A-110N and non-condensing boilers 120A-120N can be configured to communicate with the controller 102. For example, the condensing boilers 110A-110N and non-condensing boilers 120A-120N can send data to the controller 102. As non-limiting examples, the data can relate to one or more of: which boiler(s) is/are available, the type(s) of boiler available, the capacities of boiler available, a current operating status for the system 100 and/or one or more individual boilers, historical operating status for the system 100 and/or one or more individual boilers (e.g., how long the boiler has been in service and how its operating performance has changed over time) (which can help indicate updated information regarding a current efficiency of a given boiler), one or more predetermined maintenance schedules, and boiler operational data indicating current boiler conditions (e.g., temperatures and/or pressures at one or more locations in the boiler or system 100, flue gas chemical composition, etc.). The condensing boilers 110A-110N and non-condensing boilers 120A-120N can also be configured to receive control signals from the controller 102 so that the controller 102 can effectively control boilers.

The temperature sensors (e.g., the supply water temperature sensor 130, the return water temperature sensor 132, the ambient air temperature sensor 134) can be or include any type of sensor suitable for the particular application. For example, the temperature sensors 130, 132, 134 can be or include a thermocouple, a resistance temperature detector (RTD), a thermistor, an infrared sensor, a semiconductor, or any other suitable type of sensor. Furthermore, the supply water temperature sensor 130 can be installed at any location where the supply water temperature sensor 130 is capable of detecting a temperature of the supply water. Similarly, the return water temperature sensor 132 can be installed in any location where the return water temperature sensor 130 is capable of detecting a temperature of the return water. The ambient air temperature sensor 134 can similarly be installed in any location where the ambient air temperature sensor 134 is capable of detecting a temperature of the ambient air.

The flow sensor 136 can detect the flow rate of the fluid at the location of the flow sensor and can transmit flow data indicative of the flow rate to the controller 102. The flow sensor 136 can be any type of flow sensor, and the flow sensor 136 can be configured to simply detect fluid flow (i.e., whether the fluid is flowing or not) or can detect a rate of flow of the fluid. If the flow sensor 136 simply measures the presence of fluid flow, the flow sensor 136 can be a flow switch. If the flow sensor 136 is a flow switch, it can be a vane actuated flow switch, a disc actuated flow switch, a liquid flow switch, or any other appropriate type of flow switch for the application. If the flow sensor 136 measures the rate of fluid flow, the flow sensor 136 can be a flow meter or another type of rate-measuring flow sensor. For example, the flow sensor 136 can be a differential pressure flow meter, a positive displacement flow meter, a velocity flow meter, a mass flow meter, an open channel flow meter, or any other type of flow meter configured to measure flow rate of a fluid.

Figure 2:
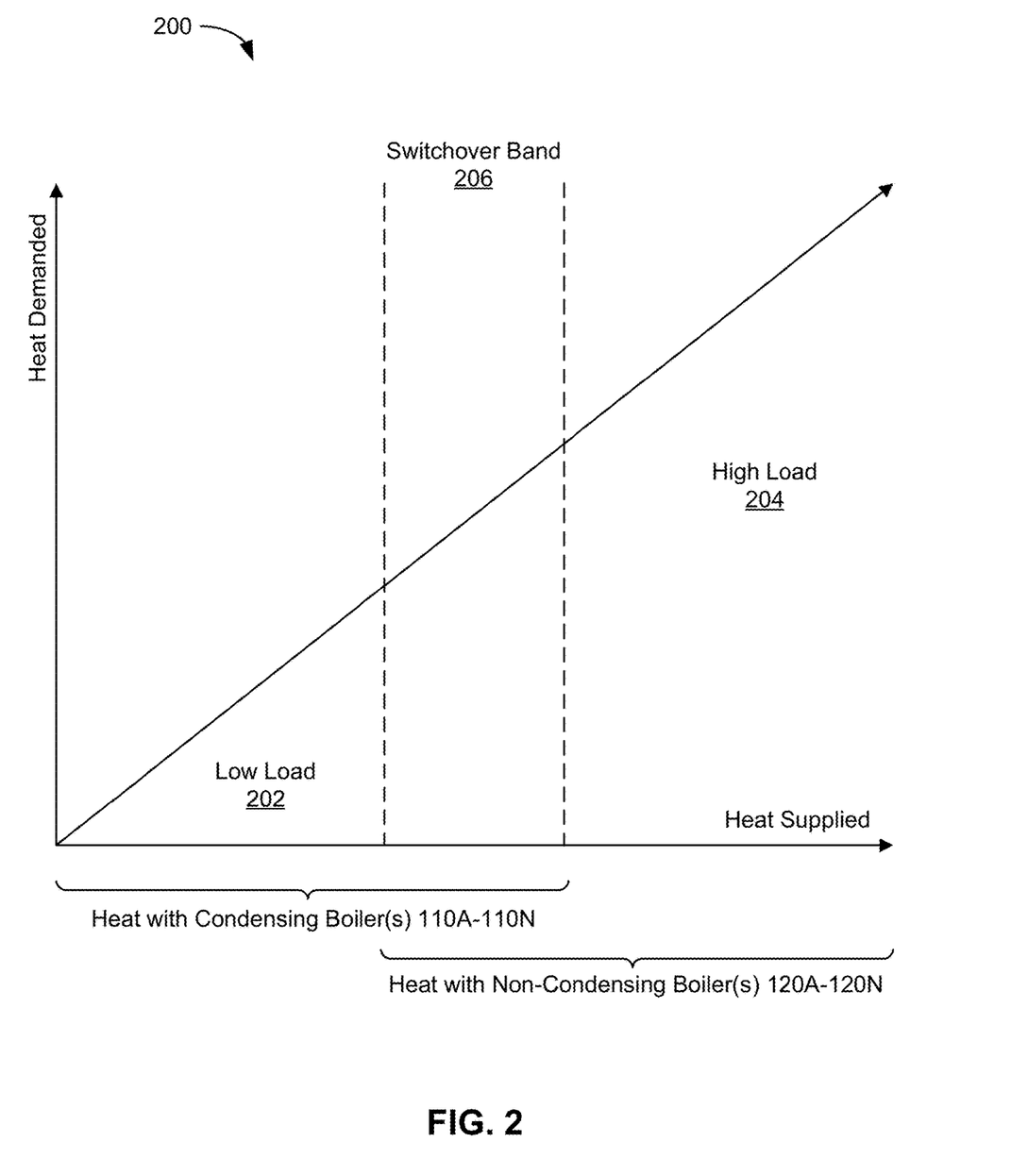
FIG. 2 illustrates a graph depicting a method of intelligently controlling a hybrid cascade boiler system, in accordance with the disclosed technology.

As depicted in FIG. 2, the controller 102 can be configured to output one or more control signals to one or more boilers (e.g., one or more condensing boilers 110A-110N and/or one or more non-condensing boilers 120A-120N) to control the boiler(s) to meet the current load demand while optimizing energy use. For example, the controller 102 can be configured to determine that a small load is demanded and that a condensing boiler (e.g., one of the condensing boilers 110A-110N) would be the most efficient boiler to respond to the smaller demand. Similarly, the controller 102 can be configured to determine that a large load is demanded and that a non-condensing boiler (e.g., one of the non-condensing boilers 120A-120N) would be the most efficient boiler to respond to the large demand.

The controller 102 can additionally be configured to determine which type and capacity of boiler would be the most efficient to operate in response to the current load demand based on data received from one or more of the various sensors (e.g., supply water temperature sensor 130, return water temperature sensor 132, ambient air temperature sensor 134). As one of skill in the art will appreciate, and as illustrated in FIG. 2, condensing boilers (e.g., condensing boilers 110A-110N) can be more efficient to operate at lower loads 202, while non-condensing boilers (e.g., non-condensing boilers 120A-120N) can be more efficient at higher loads 204. For example, when the controller 102 receives flow data from the flow sensor 136 indicating that the flow through the system 100 is less than a given threshold, the controller 102 can determine that a boiler (e.g., condensing boilers 110A-110N and/or non-condensing boilers 120A-120N) having a lower capacity and turndown ratio would most efficiently meet the load demand. Alternatively, when the controller 102 receives flow data from the flow sensor 136 indicating that flow through the system is equal to or greater than a given threshold, the controller 102 can determine that a boiler (e.g., condensing boilers 110A-110N and/or non-condensing boilers 120A-120N) having a higher capacity and turndown ratio would most efficiently meet the current load demand. Furthermore, the controller 102 can be configured to determine based on temperature data received from a temperature sensor (e.g., supply water temperature sensor 130, return water temperature sensor 132, and/or ambient air temperature sensor 134) indicating that the water temperature is less a threshold temperature that a condensing boiler (e.g., condensing boilers 110A-110N) would most efficiently meet the current load demand. Alternatively, the controller 102 can be configured to determine, based on temperature data received from a temperature sensor (e.g., supply water temperature sensor 130, return water temperature sensor 132, and/or ambient air temperature sensor 134) indicating that the water temperature is greater a threshold temperature, that a condensing boiler (e.g., non-condensing boilers 120A-120N) would most efficiently meet the current load demand.

The controller 102 can also be configured to recognize a range between high loads 204 and low loads 202 in which a combination of non-condensing and condensing boilers operated in parallel can be more efficient to meet the load demand rather than using only non-condensing boilers or only condensing boilers. The specific values of this "switchover band" 206 between low loads 202 (corresponding to the efficient use of condensing boilers) and high loads 204 (corresponding to the efficient use of non-condensing boilers) is dependent on the system temperature (as detected by supply water temperature sensor 130, return water temperature sensor 132, and/or ambient air temperature sensor 134), as well as other various system parameters. For example, if the temperature of the water in the system (e.g., as detected by supply water temperature sensor 130 and/or return water temperature sensor 132) is below a threshold temperature, the controller 102 can determine that it would be more efficient to operate one or more of the condensing boilers 110A-110N to meet the current load demand.

Furthermore, the controller 102 can be configured to continuously monitor the current load demand to determine if and when to output a control signal to one or more condensing boilers (e.g., condensing boilers 110A-110N) and/or one or more non-condensing boilers (e.g., non-condensing boilers 120A-120N) instructing the boiler(s) to transition between a heating mode and a standby mode (e.g., a non-heating mode). Placing the boilers in a heating mode can include outputting a control signal for the boilers to begin heating the water in the boiler system. On the other hand, placing the boilers in a standby mode can include outputting a control signal for the boilers to not heat the water in the boiler system, reduce the boilers to a minimum or standby output, and/or shut down the boilers altogether. The controller 102 can continuously monitor the current load demand by being configured to repeatedly check the current load demand based on a predetermined time interval. For example, the controller 102 can be configured to monitor the current load demand on an interval ranging from a fraction of a second to several minutes depending on the particular application. Therefore, even after the controller 102 has output a control signal to a boiler, the controller 102 can continue to monitor the current load demand and adjust the output of the boiler system 100 depending on the current load demand. As will be appreciated, by continuously monitoring a current load demand, the controller 102 can be configured to detect changes in the load demand across the building throughout the day to ensure the boiler system 100 operates efficiently for the current system conditions. For example, the controller 102 can determine when the load demand changes throughout the day as a result of the sun's position in the sky, current weather conditions, the number of occupants in the building, the use or non-use of machinery in the building, and/or other conditions that can cause the load demand to change throughout the day.

Figure 3:
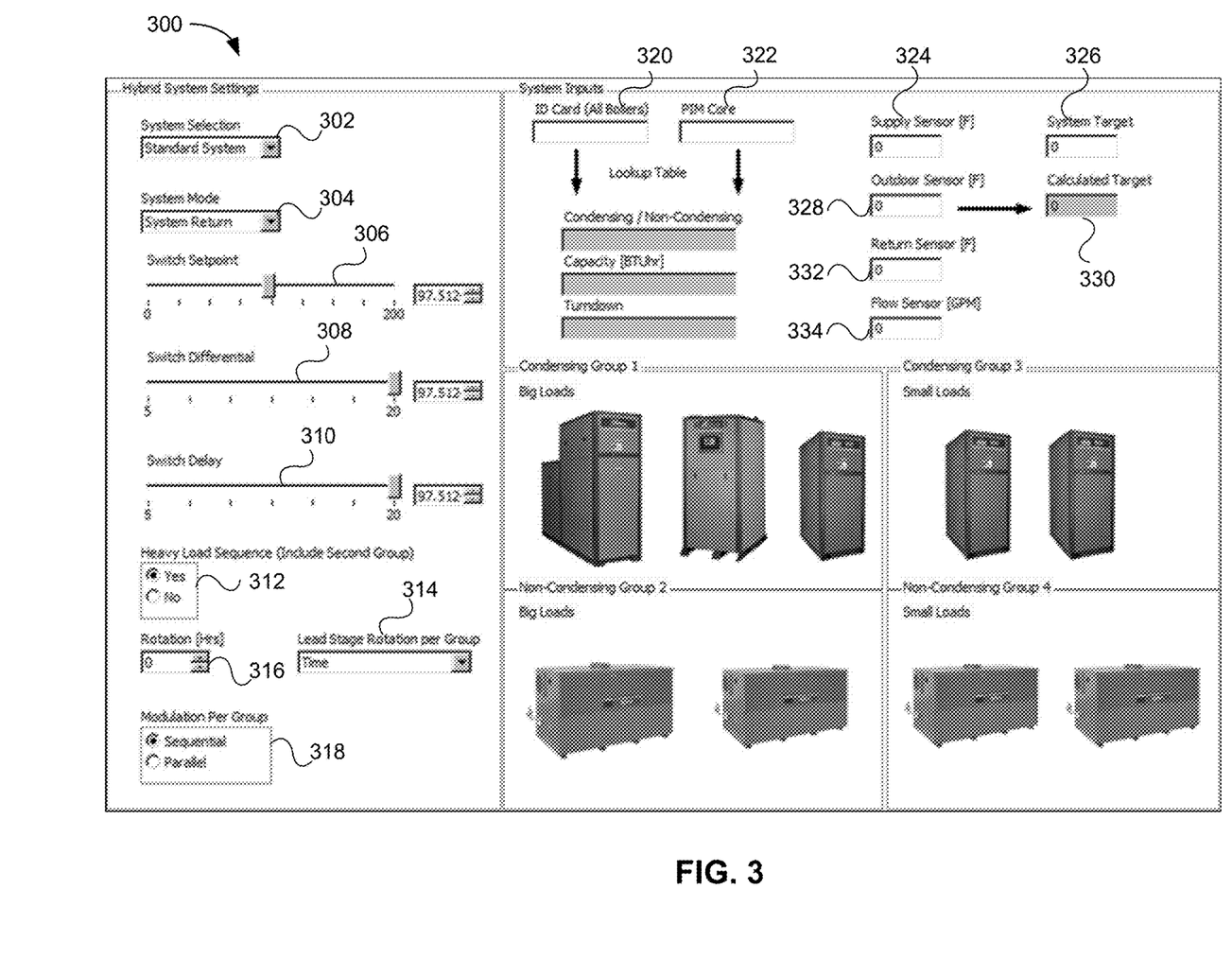
FIG. 3 illustrates an example user interface for a system capable of intelligently controlling a cascade boiler system, in accordance with the disclosed technology.

FIG. 3 depicts an example interface 300 for a user interface such as, for example, user interface 108. The interface 300 can include a visual display of various system settings and inputs. The system settings available for a user to view can include system selection 302, system mode 304, switch setpoint 306, switch differential 308, switch delay 310, heavy load sequence 312, lead stage rotation per group 314, rotation time 316, and modulation per group 318. The system inputs can include information relating to the available boilers (e.g., one or more condensing boilers 110A-110N and/or one or more non-condensing boilers 120A-120N) including an ID card 320, PIM core 322, as well as system parameter information provided by the various sensors including: supply sensor temperature data 324, system target temperature data 326, outdoor sensor temperature data 328, calculated target temperature data 330, return sensor temperature data 332 and flow sensor flowrate data 334. In addition, the interface 300 can include a visual display of the available boilers including a visual grouping of the available boilers based on type and capacity as depicted in FIG. 3. As will be appreciated, the interface 300 of the user interface (e.g., user interface 108) can be modified for the particular application. Furthermore, the user interface can be configured to receive inputs by a user through various methods including, but not limited to, a touch screen, a keyboard, a mouse, a connected computer, a connected mobile device, or any other method suitable for the particular application.

The system selection 302 can include an interface for selecting between at least two different settings including a hybrid cascade selection and a standard system selection. If a user selects the hybrid cascade selection, the controller 102 can activate a process for operating the system 100 using a combination of condensing and non-condensing boilers (e.g., condensing boilers 110A-110N and non-condensing boilers 120A-120N) in a cascading arrangement and change the interface 300 to enable additional menu options pertaining to a hybrid cascade configuration as described herein. If the user selects standard system, the controller 102 can activate a process for operating the system 100 under a standard boiler arrangement.

The system mode 304 can include various options for changing the configuration of the system 100 (e.g., how or which portions of the system 100 will perform) depending on which option the user has selected in the system selection 302. The system mode 304 can include a supply sensor option, a return sensor option, and a supply and return sensor option. Each option can correspond to a different control methodology (i.e., how the various available boilers are controlled).

For example, the supply sensor option can correspond to the controller 102 constantly or repeatedly (e.g., once every predetermined unit of time) monitoring temperature data received from the supply water temperature sensor 130 and determining when it would be more efficient to operate one or more condensing boilers 110A-110N, one or more non-condensing boilers 120A-120N, or a combination thereof.

As another example, the return sensor option can correspond to the controller 102 monitoring return water temperature data received from the return water temperature sensor 132 and determining when it would be more efficient to operate one or more condensing boilers 110A-110N, one or more non-condensing boilers 120A-120N, or a combination thereof.

As yet another example, the supply and return sensor option can correspond to the controller 102 monitoring water temperature data received from both the supply water temperature sensor 130 and the return water temperature sensor 132 and determining an actual load demand of the system 100. As previously described, existing boiler control systems utilize a predetermined temperature differential that is calculated for the building in which the system 100 is installed or is to be installed. Because the temperature differential across a building can change throughout the day and during different seasons of the year, a static, predetermined temperature differential as used by existing systems can fail to provide an accurate temperature differential from which to calculate a current load demand. Therefore, by using data from both the supply water temperature sensor 130 and the return water temperature sensor 132, the controller 102 can determine a real-time or substantially real-time temperature differential across the building that can be used to determine the current load demand and efficiently control the boilers. Furthermore, the controller 102 can be further configured to record historical data about the actual load demand throughout the day and throughout the year to determine which type and capacity of boiler to operate to meet the current load demand. For example, the controller 102 can record the temperature differential calculated using data from both the supply water temperature sensor 130 and the return water temperature sensor 132 throughout the day and/or throughout the year. The controller 102 can then use this recorded data to anticipate the load throughout the day and/or throughout the year.

The system mode 304 setting can enable additional settings available for user configuration (e.g., via the interface 300). The additional settings can include a switch setpoint 306, a switch differential 308, and a switch delay 310. The switch setpoint 306 setting can include a user-selectable setting that defines a supply water threshold temperature at which the controller 102 can determine whether it would be more efficient to operate one or more condensing boilers 110A-110N, one or more non-condensing boilers 120A-120N, or a combination thereof. The supply water threshold temperature can be selected from an available range of temperatures, such as a range from 0° F. to 250° F., for example.

The switch differential 308 setting can allow a user to manually configure the system to operate based on a differential temperature offset that can be calculated (e.g., by the controller 102) based on data from the supply water temperature sensor 130 in lieu of operating using data from the return water temperature sensor 132. The switch differential value 308 can be selected from an available range of temperatures, such as a range from 0° F. to 30° F., for example.

The switch delay 310 setting can allow a user to manually configure the system to wait a predetermined amount of time before switching between types of boilers. This can help compensate for abrupt supply water temperature variations, which can help prevent the system 100 from unnecessarily cycling between boilers too frequently. As will be appreciated, frequent cycling of boilers can cause the boilers to degrade faster than normal and lead to overall system inefficiencies. Therefore, the switch delay setting 310 can help to extend the life of the boilers and maintain high system efficiencies. The switch delay 310 setting can include an option for a user to specify a duration of time to delay switching between boilers, which can be any suitable length of time for the application, such as 0 minutes to 20 minutes, for example.

The interface 300 of the user interface (e.g., user interface 108) can include a heavy load sequence 312 setting that can act as a user-selected override to allow a user to enable additional predetermined boilers to be operated as a backup in case an initially-selected boiler or group of boilers is unable to meet a current load demand. This setting can help to ensure the system continues to provide heat quickly even if using the additional predetermined boilers would not be the most energy efficient way to respond to the current load demand.

Although not shown in FIG. 3, the interface 300 can additionally include a load distribution setting that can configure the controller (e.g., controller 102) to assign available boilers to categories of large and small loads as well as condensing and non-condensing boilers. If a user selects the load distribution setting, the controller 102 can additionally enable a load threshold setting on the interface 300 that can be configured by a user to specify at what threshold the controller 102 should switch between condensing and non-condensing boilers and between boilers assigned to the large or small load categories.

The interface 300 of the user interface (e.g., user interface 108) can include a lead stage rotation per group 314 setting through which a user can configure how the controller 102 will select the available boilers being operated (e.g., the controller 102 can rotate through available boilers to ensure boilers are used at least once during a predetermined duration). The lead stage rotation per group 314 setting can include a time-defined rotation setting, a force rotation setting, and a sequential rotation setting. If the user selects the time-defined rotation setting, the interface 300 of the user interface can display a user-selectable rotation time 316 for a user to set the time for rotating between available boilers. In this configuration, the user can assign predetermined groups of boilers to be available for response to a load demand for a predetermined amount of time. Once the predetermined group of boilers has been operated for the predetermined amount of time, the controller 102 can switch to another predetermined group of boilers to continue to meet the load demand. Rotating between operating boilers can help to elongate the overall life of the boiler system because the boiler groups will each be operated for equal amounts of time.

As mentioned previously, a user can additionally select the force rotation setting in the lead stage rotation per group 314 setting. The force rotation setting can allow a user to manually switch to a different operating boiler group which can be useful, for example, if the user wants to shut down a group of boilers for maintenance. The user can also select a sequential rotation setting in the lead stage rotation per group 314 setting. The sequential rotation setting can configure the controller to rotate between operating boiler groups between each load demand. For example, if the user selects the sequential rotation setting, the controller can operate a predetermined group of boilers to meet a load demand and, after shutting down the group of boilers once the load demand has been met, the controller can operate the next group of predetermined boilers to meet the next load demand. Thus, rather than continuing to operate a predetermined group of boilers for a predetermined amount of time as would be the case with the time defined rotation setting, the controller will operate a predetermined group of boilers only until the present load demand is met and then switch to the next group of predetermined boilers for the next load demand.

The modulation per group 318 setting can include a user-selectable setting to configure the controller 102 to either run a predetermined group of boilers in sequential control mode or parallel control mode. If the user selects sequential control mode, the controller, upon detecting a load demand, will operate a single boiler to 100% capacity before operating a second boiler within the predetermined group. In parallel control mode, the controller will operate all boilers within a predetermined group in parallel so that they all respond to the load demand simultaneously. For example, the controller 102 in parallel control mode can output a control signal to simultaneously ramp up selected boilers from 0% capacity to 100% capacity. As another example, the controller 102 in parallel control mode can output a control signal to all available boilers to turn on and remain at minimum firing rate until each boiler's output should be adjusted (i.e., ramped up to a higher output). Alternatively, the controller 102 can be configured to automatically determine, based on the current system conditions and load demand, whether it would be more efficient to respond to the load demand by operating the boilers in parallel control mode or sequential control mode.

As discussed previously, the interface 300 of the user interface 108 can include a display of several system inputs including information relating to the available boilers (e.g., condensing boilers 110A-110N and non-condensing boilers 120A-120N). The controller 102, once in communication with a boiler, can be configured to receive boiler data directly from the boiler. Alternatively, or in addition, the controller 102 can be configured to receive data from a user indicating the boiler type, capacity, and turndown ratio of the boiler. The user can provide the data to the controller 102 by, for example, entering in the information manually into the interface 300, entering in an identification number associated with the boiler which the controller 102 can use to retrieve stored information about the boiler, by scanning an identification date of the boiler, by looking up the boiler data in a table displayed on the interface 300 and stored in the memory 104, or by any other method suitable for the application. Once the controller 102 receives the data, the controller 102 can display the data on the interface 300 as an ID Card 320 and a Product Information Management core 322 (PIM Core) for a user to view and the controller 102 to use the data to help determine which boiler would be most efficient to respond to a load demand.

The interface 300 can also display system parameter information provided by the various sensors including: supply sensor temperature data 324, system target temperature data 326, outdoor sensor temperature data 328, return sensor temperature data 332, and flow sensor flowrate data 334. The supply sensor temperature data 324 can be a display of a current water temperature as detected by, for example, supply water temperature sensor 130. The system target temperature data 326 can be a display of a user-defined temperature that the system can use to determine whether a current output temperature is sufficiently meeting the target temperature (e.g., a load demand). The outdoor sensor temperature data 328 can be a display of a current outdoor or ambient temperature as detected by, for example, the ambient air temperature sensor 134. The interface 300 can additionally display a corresponding calculated target temperature data 330 that is indicative of a target output temperature necessary to meet the current load demand based on the data received from the ambient air temperature sensor 134. The return sensor temperature data 332 can be a display of a current water temperature as detected by, for example, the return water temperature sensor 132. The flow sensor flowrate data 334 can be a display of a current flowrate of water in the system 100 as detected by, for example, the flow sensor 136. As will be appreciated, a user or other individual can use the displayed data to help determine current system parameters and performance.

Figure 4:
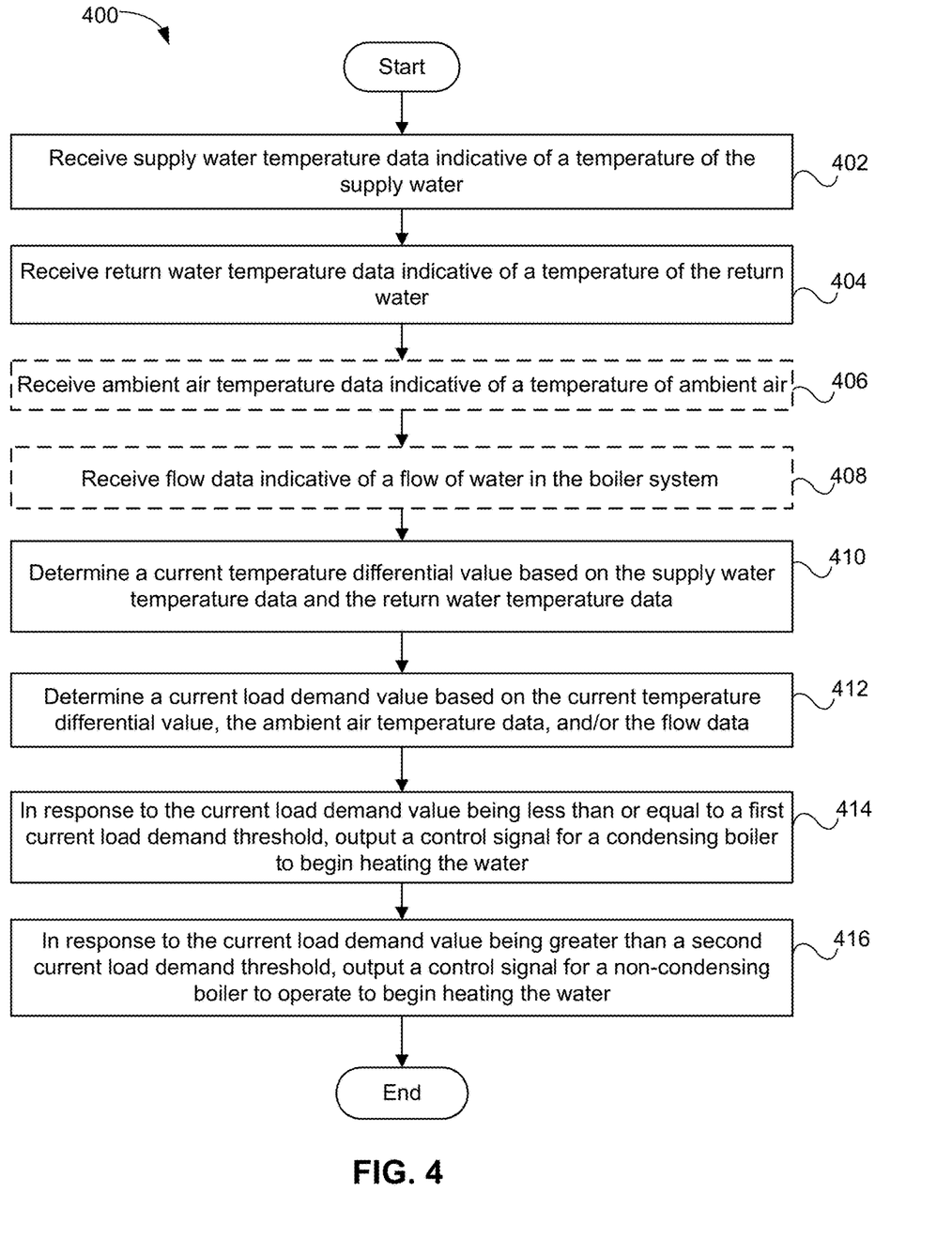
FIG. 4 illustrates a flowchart of a method of intelligently controlling a hybrid cascade boiler system, in accordance with the disclosed technology.

FIG. 4 is a flowchart illustrating an example method 400 of operating a cascade boiler system according to the disclosed technology. The method 400 can include receiving 402 (e.g., from the supply water temperature sensor 130)

supply water temperature data indicative of a temperature of the supply water and receiving 404 (e.g., from the return water temperature sensor 132) return water temperature data indicative of a temperature of the return water. As will be appreciated, by receiving the supply water temperature data and the return water temperature data, the controller (e.g., controller 102) can determine a current load demand that is indicative of an actual load demand currently in the system. By determining the current load demand (e.g., in real-time), the disclosed technology can overcome limitations of systems that use an assumed calculated load for the system. Optionally, the method 400 can also include receiving 406 (e.g., from the flow sensor 136) water flow rate data indicative of a flow rate of the water in the system and/or receiving 408 (e.g., from the ambient air temperature sensor 134) ambient air temperature data indicative of a temperature of the ambient air. The flow data and/or the ambient air temperature data can be used by the controller to further determine the current load demand to more accurately and efficiently control the cascade boiler system. For example, the ambient air temperature data can be used to determine changing ambient air conditions that could affect a load demand in the cascade boiler system (i.e., a temperature rise or fall as ambient conditions change throughout the day). Similarly, the flow data can be used to determine a heating capacity needed to meet the current load demand. For example, higher flow can require greater heating capacity while lower flow can require less heating capacity depending on the current load demand.

Upon receiving some or all of the aforementioned data, the method 400 can further include determining 410 a current temperature differential value based on the supply water temperature data and the return water temperature data and determining 412 a current load demand value based on the current temperature differential value, the ambient air temperature data, and/or the flow data. In response to the current load demand value being less than or equal to a first load demand threshold, the method 400 can include outputting 414 a control signal for a condensing boiler to begin heating the water. Alternatively, in response to the current load demand value being greater than a second load demand threshold, the method 400 can include outputting 416 a control signal for a non-condensing boiler to begin heating the water. The first load demand threshold and the second load demand threshold can be the same threshold value or can be different values. As will be appreciated, the first load demand threshold and the second load demand threshold can correspond to threshold values (e.g., as described in relation to FIG. 2) where it can be more efficient to operate a condensing boiler when the current load demand is less than or equal to the first load demand threshold and to operate a non-condensing boiler when the current load demand is greater than or equal to the second load demand threshold.

Figure 5:
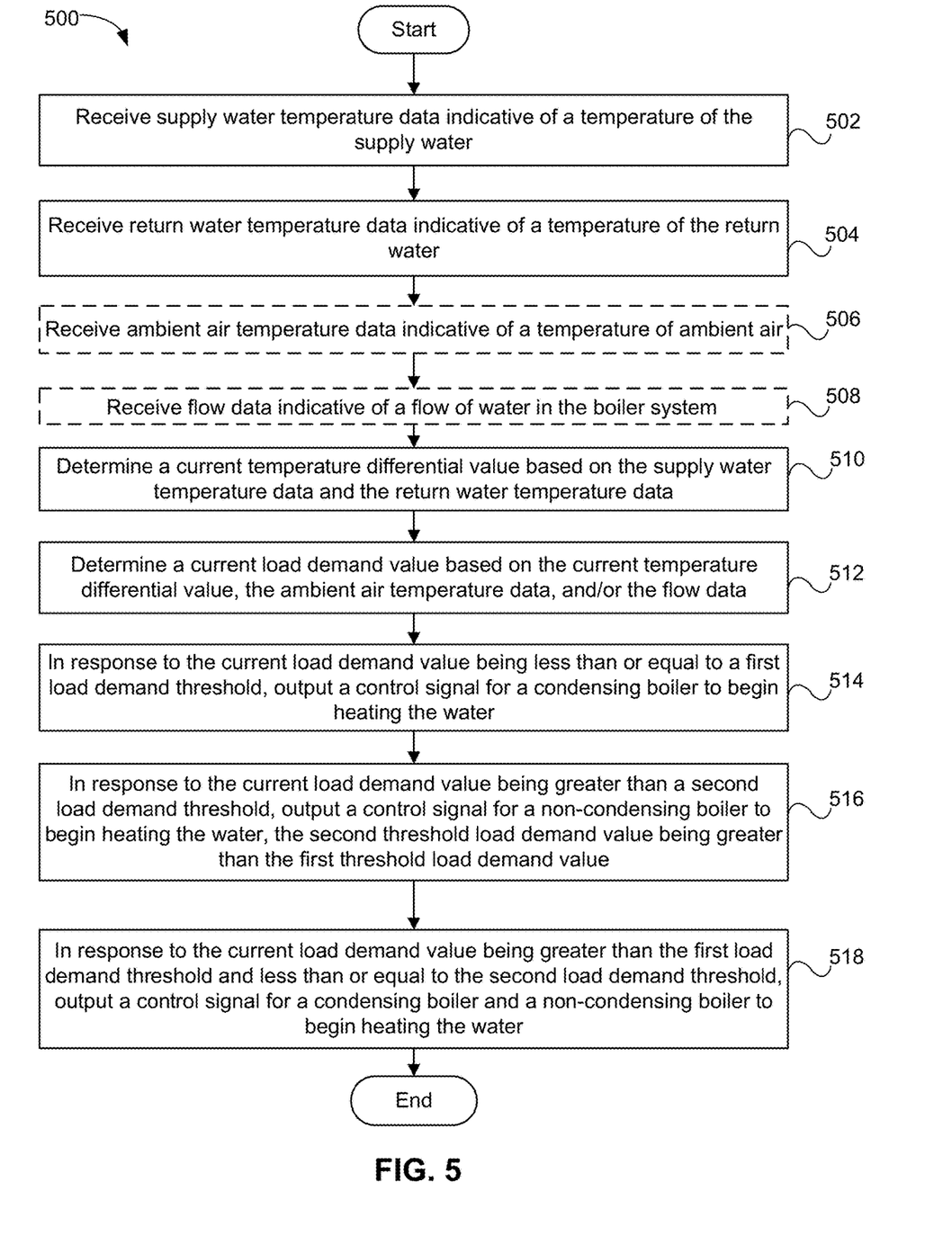
FIG. 5 illustrates a flowchart of a method of intelligently controlling a hybrid cascade boiler system, in accordance with the disclosed technology.

As another example, FIG. 5 depicts a method 500 of operating a cascade boiler system according to the disclosed technology. Similar to method 400, method 500 can include receiving 502 (e.g., from the supply water temperature sensor 130) supply water temperature data indicative of a temperature of the supply water and receiving 504 (e.g., from the return water temperature sensor 132) return water temperature data indicative of a temperature of the return water. Optionally, the method 500 can also include receiving 506 (e.g., from the flow sensor 136) water flow rate data indicative of a flow rate of the water in the system and/or receiving 508 (e.g., from the ambient air temperature sensor 134) ambient air temperature data indicative of a temperature of the ambient air.

Upon receiving some or all of the supply water temperature data, return water temperature data, flow rate data, and ambient air temperature data, the method 500 can further include determining 510 a current temperature differential value based on the supply water temperature data and the return water temperature data and determining 512 a current load demand value based on the current temperature differential value, the ambient air temperature data, and/or the flow data. In response to the current load demand value being less than or equal to a first load demand threshold, the method 500 can include outputting 514 a control signal for a condensing boiler to begin heating the water. In response to the current load demand value being greater than a second load demand threshold, the method 500 can include outputting 516 a control signal for a non-condensing boiler to begin heating the water, the second load demand threshold being greater than the first load demand threshold. Further, in response to the current load demand value being greater than the first load demand threshold and less than or equal to the second load demand threshold, the method 500 can include outputting 518 a control signal for a condensing boiler and a non-condensing boiler to begin heating the water.

As will be appreciated, and as described in relation to FIG. 4, the first load demand threshold and the second load demand threshold can be different threshold values. The threshold values can be the threshold values described in relation to FIG. 2 where it can be more efficient to operate a condensing boiler when the current load demand is less than or equal to the first load demand threshold and to operate a non-condensing boiler when the current load demand is greater than or equal to the second load demand threshold. Accordingly, method 500's step of outputting 518 the control signal for both a condensing boiler and a non-condensing boiler to heat water can correspond to a load demand in the switchover band described in relation to FIG. 2 where it can be efficient to operate both condensing and non-condensing boilers simultaneously.

Figure 6:
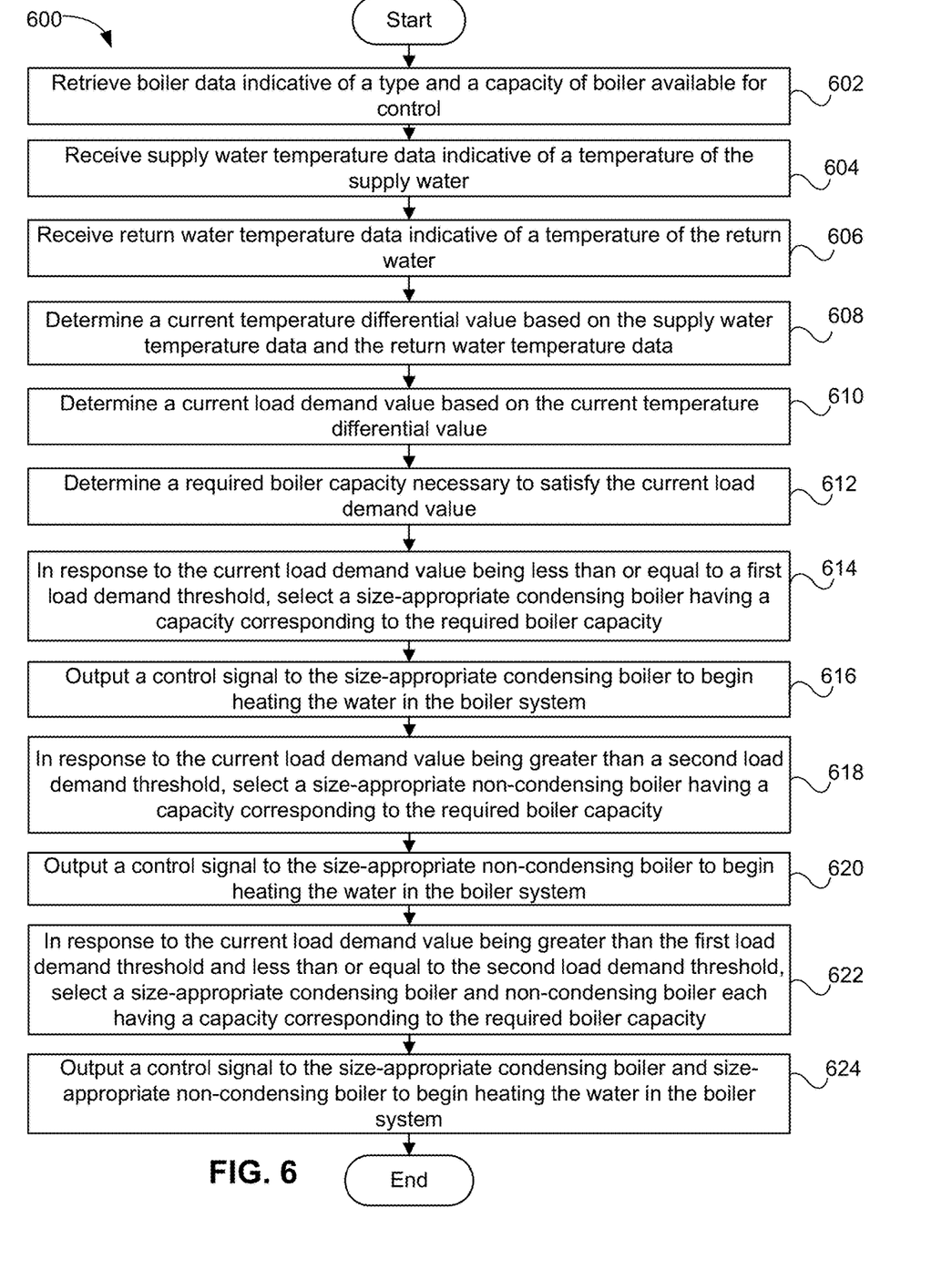
FIG. 6 illustrates a flowchart of a method of intelligently controlling a hybrid cascade boiler system, in accordance with the disclosed technology.

FIG. 6 depicts an example method 600 of operating a cascade boiler system according to the disclosed technology. Method 600 can include retrieving boiler data indicative of a type and a capacity of boiler available for control. The boiler data can correspond to a plurality of boilers installed on the system (e.g., condensing boilers 110A-110N and non-condensing boilers 120A-120N). The method 600 can include receiving 604 (e.g., from the supply water temperature sensor 130) supply water temperature data indicative of a temperature of the supply water and receiving 606 (e.g., from the return water temperature sensor 132) return water temperature data indicative of a temperature of the return water.

Upon receiving all or a combination of the just described data, the method 600 can further include determining 608 a current temperature differential value based on the supply water temperature data and the return water temperature data and determining 610 a current load demand value based on the current temperature differential value. Upon determining a current load demand value, the method 600 can include determining 612 a required boiler capacity (e.g., a required boiler output) necessary to satisfy the current load demand value.

In response to the current load demand value being less than or equal to a first load demand threshold, the method 600 can include selecting 614 a size-appropriate condensing boiler having a capacity corresponding to the required boiler capacity. The method 600 can include outputting 616 a control signal to the size-appropriate condensing boiler to begin heating the water in the boiler system.

In response to the current load demand value being greater than a second load demand threshold, the method 600 can include selecting 618 a size-appropriate non-condensing boiler having a capacity corresponding to the required boiler capacity. The method 600 can then further include outputting 620 a control signal to the size-appropriate condensing boiler to begin heating the water in the boiler system.

Furthermore, in response to the current load demand value being greater than the first load demand threshold and less than or equal to the second load demand threshold, the method 600 can include selecting 622 a size-appropriate condensing boiler and non-condensing boiler each having a capacity corresponding to the required boiler capacity. The method 600 can include outputting 624 a control signal to the size-appropriate condensing boiler and size-appropriate non-condensing boiler to begin heating the water in the boiler system. As will be appreciated, by determining and selecting the type and size of an appropriate boiler, method 600 can determine the most efficient boiler of the available boilers to operate based on the current demand load.

As will be appreciated, the methods 400, 500, and 600 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. As non-limiting examples, although not described in methods 400, 500, and/or 600, each of the methods can include additional elements described herein such as operating the boilers with a time delay, operating the boilers in parallel or sequential mode, operating the boilers based on a rotation schedule, and/or operating the boilers based on historical data.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A non-transitory, computer-readable medium storing instructions that, when executed by one or more processors, cause a boiler system controller to:
   receive, from a supply water temperature sensor, supply water temperature data indicative of a temperature of water supplied from a boiler system associated with the boiler system controller;
   receive, from a return water temperature sensor, return water temperature data indicative of a temperature of water returning to the boiler system;
   determine a current temperature differential value based at least in part on the supply water temperature data and the return water temperature data;
   determine a current load demand value based at least in part on the current temperature differential value and a set point temperature;
   retrieve, from a memory associated with the controller, a boiler operation schedule corresponding to operation of a plurality of boilers; and
   instruct one or more boilers from among the plurality of boilers to transition to a heating mode for heating water in the boiler system based on the boiler operation schedule, the plurality of boilers comprising at least one condensing boiler and at least one non-condensing boiler, wherein instructing the one or more boilers from among the plurality of boilers to transition to the heating mode for heating water in the boiler system comprises:
      in response to the current load demand value being less than or equal to a first load demand threshold, output a control signal for the at least one condensing boiler to transition to the heating mode for heating water in the boiler system; and
      in response to the current load demand value being greater than a second load demand threshold, output a control signal for the at least one non-condensing boiler to transition to the heating mode for heating water in the boiler system.

2. The non-transitory, computer-readable medium of claim 1, wherein the set point temperature is defined by a user.

3. The non-transitory, computer-readable medium of claim 1, wherein the second load demand threshold is greater than the first load demand threshold, and
   wherein instructing the one or more boilers from among the plurality of boilers to transition to the heating mode for heating water in the boiler system further comprises:
      in response to the current load demand value being greater than the first load demand threshold and less than or equal to the second load demand threshold, output a control signal for the at least one condensing boiler and the at least one non-condensing boiler to transition to the heating mode for heating water in the boiler system.

4. The non-transitory, computer-readable medium of claim 1, wherein the instructions, when executed by the one or more processors, further cause the boiler system controller to:
   retrieve boiler data indicative of a type and a capacity of boiler available for heating;
   determine, based on the current load demand value, a required boiler capacity necessary to satisfy the current load demand value; and
   wherein instructing the one or more boilers from among the plurality of boilers to transition to the heating mode for heating water in the boiler system comprises:
      in response to the current load demand value being less than or equal to the first load demand threshold:
         selecting a size-appropriate condensing boiler, the size-appropriate condensing boiler having a capacity corresponding to the required boiler capacity; and
         outputting a control signal to the size-appropriate condensing boiler to transition to the heating mode for heating water in the boiler system; and
      in response to the current load demand value being greater than the second load demand threshold:

selecting a size-appropriate non-condensing boiler, the size-appropriate non-condensing boiler having a capacity corresponding to the required boiler capacity; and outputting a control signal to the size-appropriate non-condensing boiler to transition to the heating mode for heating water in the boiler system.

5. The non-transitory, computer-readable medium of claim 1, wherein:
the instructions, when executed by the one or more processors, further cause the boiler system controller to:
receive, from a flow sensor, flow data indicative of a flow of water in the boiler system, and
determining the current load demand value further comprises:
determining the current load demand value based at least in part on the current temperature differential value, the set point temperature, and the flow data.

6. The non-transitory, computer-readable medium of claim 5, wherein the instructions, when executed by the one or more processors, further cause the boiler system controller to:
in response to the current load demand value being greater than the first load demand threshold and less than or equal to the second load demand threshold, output a control signal for the at least one condensing boiler and the at least one non-condensing boiler to transition to the heating mode for heating water in the boiler system, the second load demand threshold being greater than the first load demand threshold.

7. The non-transitory, computer-readable medium of claim 1, wherein:
the instructions, when executed by the one or more processors, further cause the boiler system controller to:
receive, from an ambient air temperature sensor, ambient air temperature data indicative of a temperature of ambient air, and
determining the current load demand value further comprises:
determining the current load demand value based at least in part on the current temperature differential value, the set point temperature, and the ambient air temperature data.

8. The non-transitory, computer-readable medium of claim 7, wherein the instructions, when executed by the one or more processors, further cause the boiler system controller to:
in response to the current load demand value being greater than the first load demand threshold and less than or equal to the second load demand threshold, output a control signal for the at least one condensing boiler and the at least one non-condensing boiler to transition to the heating mode for heating water in the boiler system, the second load demand threshold being greater than the first load demand threshold.

9. The non-transitory, computer-readable medium of claim 1, wherein the instructions, when executed by the one or more processors, further cause the boiler system controller to:
retrieve, from the memory associated with the boiler system controller, a predetermined parallel control setting configured to cause the controller to operate the plurality of boilers in a parallel control mode; and
wherein instructing the one or more boilers from among the plurality of boilers to transition to the heating mode for heating water in the boiler system further comprises:
in response to the current load demand value being less than or equal to the first load demand threshold and based on the predetermined parallel control setting, output a control signal for a plurality of condensing boilers from among the plurality of boilers to transition to the heating mode for heating water in the boiler system in the parallel control mode; and
in response to the current load demand value being greater than the second load demand threshold and based on the predetermined parallel control setting, output a control signal for a plurality of non-condensing boilers from among the plurality of boilers to transition to the heating mode for heating water in the boiler system in the parallel control mode.

10. The non-transitory, computer-readable medium of claim 9, wherein the predetermined parallel control setting is defined by a user.

11. The non-transitory, computer-readable medium of claim 1, wherein the instructions, when executed by the one or more processors, further cause the boiler system controller to:
retrieve, from the memory associated with the controller, a predetermined sequential control setting configured to cause the controller to operate the plurality of boilers in a sequential control mode; and
wherein instructing the one or more boilers from among the plurality of boilers to transition to the heating mode for heating water in the boiler system further comprises:
in response to the current load demand value being less than or equal to the first load demand threshold and based on the predetermined sequential control setting, output a control signal for a plurality of condensing boilers from among the plurality of boilers to transition to the heating mode for heating water in the boiler system in the sequential control mode; and
in response to the current load demand value being greater than the second load demand threshold and based on the predetermined sequential control setting, output a control signal for a plurality of non-condensing boilers from among the plurality of boilers to transition to the heating mode for heating water in the boiler system in the sequential control mode.

12. The non-transitory, computer-readable medium of claim 11, wherein the predetermined sequential control setting is defined by a user.

13. The non-transitory, computer-readable medium of claim 1, wherein the boiler operation schedule is user-inputted.

14. The non-transitory, computer-readable medium of claim 1, wherein:
the instructions, when executed by one or more processors, further cause the boiler system controller to:
retrieve, from the memory associated with the boiler system controller, a time delay setting configured to cause the controller to delay output of one or more control signals for a delay duration to prevent excessive cycling of the one or more boilers of the plurality of boilers; and
instructing the one or more boilers from among the plurality of boilers to transition to the heating mode for heating water in the boiler system further comprises:

in response to the current load demand value remaining less than or equal to the first load demand threshold and subsequent to expiration of the delay duration, output the control signal for the at least one condensing boiler to transition to the heating mode for heating water in the boiler system; and in response to the current load demand value remaining greater than the second load demand threshold and subsequent to expiration of the delay duration, output the control signal for the at least one non-condensing boiler to transition to the heating mode for heating water in the boiler system.

15. The non-transitory, computer-readable medium of claim 14, wherein the time delay setting is user-inputted.

16. A cascade boiler system comprising:
a plurality of boilers, the plurality of boilers comprising at least one condensing boiler and at least one non-condensing boiler;
a supply water temperature sensor configured to detect a temperature of water supplied from the cascade boiler system;
a return water temperature sensor configured to detect a temperature of water returned to the cascade boiler system;
one or more processors; and
a memory in communication with the one or more processors and storing instructions that, when executed by the one or more processors, causes the one or more processors to:
receive, from the supply water temperature sensor, supply water temperature data;
receive, from the return water temperature sensor, return water temperature data;
determine a current temperature differential value based at least in part on the supply water temperature data and the return water temperature data;
determine a current load demand value based at least in part on the current temperature differential value and a set point temperature;
retrieve, from the memory associated with the cascade boiler system, a boiler operation schedule corresponding to operation of the plurality of boilers; and
instruct one or more boilers from among the plurality of boilers to transition to a heating mode for heating water in the cascade boiler system based on the boiler operation schedule, wherein instructing the one or more boilers from among the plurality of boilers to transition to the heating mode comprises:
in response to the current load demand value being less than or equal to a first load demand threshold, output a control signal for the at least one condensing boiler to transition to the heating mode; and
in response to the current load demand value being greater than a second load demand threshold, output a control signal for the at least one non-condensing boiler to transition to the heating mode.

17. The cascade boiler system of claim 16, wherein the second load demand threshold is greater than the first load demand threshold, and
wherein instructing the one or more boilers from among the plurality of boilers to transition to the heating mode further comprises:
in response to the current load demand value being greater than the first load demand threshold and less than or equal to the second load demand threshold, output a control signal for the at least one condensing boiler and the at least one non-condensing boiler to transition to the heating mode.

18. The cascade boiler system of claim 16, wherein the instructions, when executed by the one or more processors, further cause the one or more processors to:
receive, from a flow sensor associated with the cascade boiler system, flow data indicative of a flow of water in the cascade boiler system;
and wherein determining the current load demand value further comprises:
determining the current load demand value based at least in part on the current temperature differential value, the set point temperature, and the flow data.

19. The cascade boiler system of claim 16, wherein the instructions, when executed by the one or more processors, further cause the one or more processors to:
receive, from an ambient air temperature sensor associated with the cascade boiler system, ambient air temperature data indicative of a temperature of ambient air;
and wherein determining the current load demand value further comprises:
determining the current load demand value based at least in part on the current temperature differential value, the set point temperature, and the ambient air temperature data.

* * * * *